US008455107B2

(12) United States Patent
Gabor et al.

(10) Patent No.: US 8,455,107 B2
(45) Date of Patent: Jun. 4, 2013

(54) METHOD OF TREATING CELLULOSIC MATERIALS WITH HYDROPHOBINS

(75) Inventors: Esther Gabor, Zwingenberg (DE); Andreas Buthe, Steinfurt (DE); Jürgen Eck, Heppenheim (DE); Franz Kaufmann, Freiburg (DE); Hans-Jörg Koch, Basel (CH); Guido Meurer, Seeheim-Jugenheim (DE)

(73) Assignee: BASF SE, Ludwigshafen (DE)

( * ) Notice: Subject to any disclaimer, the term of this patent is extended or adjusted under 35 U.S.C. 154(b) by 493 days.

(21) Appl. No.: 12/528,366

(22) PCT Filed: Feb. 27, 2008

(86) PCT No.: PCT/EP2008/052333
§ 371 (c)(1),
(2), (4) Date: Sep. 17, 2010

(87) PCT Pub. No.: WO2008/110456
PCT Pub. Date: Sep. 18, 2008

(65) Prior Publication Data
US 2010/0330384 A1 Dec. 30, 2010

(30) Foreign Application Priority Data
Mar. 12, 2007 (EP) .................................... 07103944

(51) Int. Cl.
*B32B 23/04* (2006.01)
(52) U.S. Cl.
USPC ........... 428/532; 428/534; 428/536; 427/384; 427/397; 427/440
(58) Field of Classification Search
USPC .................. 428/532, 536, 534; 427/384, 397, 427/440
See application file for complete search history.

(56) References Cited

U.S. PATENT DOCUMENTS

| 5,962,289 A | 10/1999 | Kilburn et al. |
| 6,228,629 B1 * | 5/2001 | Paloheimo et al. ........... 435/200 |
| 2003/0134042 A1 | 7/2003 | de Vocht et al. |
| 2003/0217419 A1 | 11/2003 | Vic |
| 2004/0089196 A1 | 5/2004 | Anderson et al. |
| 2004/0224137 A1 | 11/2004 | Rogalska et al. |
| 2005/0227931 A1 | 10/2005 | Hofer et al. |
| 2007/0077619 A1 | 4/2007 | Ostermann et al. |
| 2008/0319168 A1 | 12/2008 | Subkowski et al. |
| 2009/0101167 A1 | 4/2009 | Boeckh et al. |
| 2009/0104663 A1 | 4/2009 | Subkowski et al. |
| 2009/0117796 A1 | 5/2009 | Montag et al. |
| 2012/0202068 A1 * | 8/2012 | Bill et al. ...................... 428/408 |

FOREIGN PATENT DOCUMENTS

| DE | 10160370 A1 | 6/2003 |
| WO | 96/41882 A1 | 12/1996 |
| WO | 01/57528 A1 | 8/2001 |
| WO | 03/010331 A2 | 2/2003 |
| WO | 03/053383 A2 | 7/2003 |
| WO | 2005/033316 A2 | 4/2005 |
| WO | 2006/082251 A2 | 8/2006 |
| WO | 2006/082253 A2 | 8/2006 |
| WO | WO2006/082253 * | 8/2006 |
| WO | 2006/103215 A1 | 10/2006 |
| WO | 2006/103230 A1 | 10/2006 |
| WO | 2006/131478 A | 12/2006 |
| WO | WO2006/131478 * | 12/2006 |
| WO | 2007/014897 A | 2/2007 |
| WO | WO2007/014897 * | 2/2007 |
| WO | 2007/084711 A2 | 7/2007 |

OTHER PUBLICATIONS

Janssen et al : coating with genetic engineered hydrophobin . . . biomaterials, ESP BV, vol. 23, No. 24, Dec. 2002, pp. 4847-4854.*
Janssen et al., Biomaterials, 23 (2002) pp. 4847-4854.
English Language abstract of WO 2006/103230 from the esp@cenet web site printed on Aug. 19, 2009.
English Language abstracts of DE 101 60 370—AN 2003:467294 and 2003-588788/56.
English Language abstract of WO 2006/103215 from the esp@cenet web site printed on Aug. 19, 2009.

\* cited by examiner

*Primary Examiner* — Leszek Kiliman
(74) *Attorney, Agent, or Firm* — Shiela A. Loggins

(57) ABSTRACT

By treatment with hydrophobins, cellulosic materials such as paper, cardboard, cotton or, especially, wood-based materials, such as solid wood, glued wood products or particle board, can be effectively protected against absorption of and attack by water and/or moisture.

10 Claims, 5 Drawing Sheets

METHOD OF TREATING CELLULOSIC MATERIALS WITH HYDROPHOBINS

The present invention relates to a method of treating cellulosic materials, such as, for example, wood, with hydrophobins and to cellulosic materials that comprise hydrophobins.

The provision of wood-based materials for indoor and outdoor use with impregnations and/or coatings that are intended to improve the durability of the material and/or the appearance of the surface is known. Materials treated in such a way are said, for example, to be better preserved, to repel moisture, to be less readily soiled or to be easier to clean.

Hydrophobins are small proteins of approximately from 100 to 150 amino acids, which are characteristic of filamentous fungi, for example of *Schizophyllum commune* or *Trichoderma reesei*. In the hydrophobin moiety of the hitherto known hydrophobins, the positions of the polar and non-polar amino acids are retained. Differences in the biophysical properties and in the hydrophobicity have led to the division of the hitherto known hydrophobins into two classes, I and II (Wessels et al. 1994, Ann. Rev. Phytopathol., 32, 413-437). The assembled membranes of class I hydrophobins are highly insoluble, whereas the assembled forms of class II hydrophobins are less stable and are dissolved again, for example, by means of ethanol (e.g. 60% aqueous ethanol) or SDS (e.g. 1% aqueous SDS at room temperature). A comparison of the amino acid sequences shows that the length of the region between cysteines $C^3$ and $C^4$ in class II hydrophobins is appreciably shorter than in class I hydrophobins. Class II hydrophobins also have more charged amino acids than class I.

Hydrophobins have a marked affinity for boundary surfaces and are therefore suitable for the coating of surfaces. Thus, for example, Teflon can be coated by means of hydrophobins to obtain a hydrophilic surface.

Hydrophobins can be isolated from natural sources, but it is also possible for hydrophobins that do not occur naturally to be synthesised by means of chemical and/or biotechnological methods of preparation. The application WO 06/082251 discloses a method of preparing hydrophobins that do not occur naturally.

WO 96/41882 proposes the use of hydrophobins as emulsifiers, thickeners or surface-active substances, for rendering hydrophobic surfaces hydrophilic, for improving the water resistance of hydrophilic substrates, and for preparing oil-in-water emulsions or water-in-oil emulsions. Also proposed are pharmaceutical uses, such as the preparation of ointments or creams, and cosmetic uses, such as skin protection or the preparation of hair shampoos or hair conditioners.

EP-A 1 252 516 discloses the surface-coating of windows, contact lenses, biosensors, medical devices, containers for carrying out tests or for storage, ships' hulls, solid particles or the framework or bodywork of motor cars using a hydrophobin-containing solution at a temperature of from 30 to 80° C.

Janssen et al., Biomaterials 23, 4847 (2002), observe hydrophobicity in filter paper in which a hydrophobin solution has been dried.

WO 03/53383 discloses the use of hydrophobin for the treatment of keratinous materials in cosmetic uses.

WO 03/10331 discloses a hydrophobin-coated sensor, for example a measuring electrode, to which further substances, e.g. electroactive substances, antibodies or enzymes, have been non-covalently bound.

WO 06/82253 describes the coating of hard surfaces or leather surfaces with hydrophobins.

WO 06/103215 and WO 06/103230 disclose the use of hydrophobins for the dirt-repellent treatment of hard, as a rule mineral, surfaces.

DESCRIPTION OF THE INVENTION

It has been found that cellulosic materials, such as paper, cardboard or especially wood-based materials, such as solid wood, glued wood products or particle board, can surprisingly be effectively protected against the absorption of water or moisture by treatment with hydrophobin, and consequently the incidence of soiling, attack by microorganisms, rotting of the material caused by moisture, or undesired dimensional changes can be prevented.

In a preferred embodiment, there is used for that purpose a formulation of a hydrophobin and at least one solvent. In a second aspect of the invention, a method of treating cellulosic materials has been found in which the material is brought into contact with at least one hydrophobin, the material being selected from the group of materials of which the major portion consists of cellulose, such as, for example, paper, cardboard or wood.

A third aspect of the invention relates to a cellulosic material, such as, for example, paper, cardboard or wood, treated with at least one hydrophobin and, preferably, containing hydrophobin within its porous structure.

It has surprisingly been found that even extremely small amounts of hydrophobins are sufficient for an effective, dirt-repellent and especially hydrophobising and/or preserving treatment of cellulosic materials.

Particular details of the invention are as follows:

In accordance with the invention, at least one hydrophobin is used to treat the surface of cellulosic materials, such as, for example, paper, cardboard, wood or cotton. It will be understood that it is also possible to use a mixture of a plurality of different hydrophobins.

In the context of the invention, the term "hydrophobins" hereinbelow is to be understood as polypeptides of the general structural formula (I)

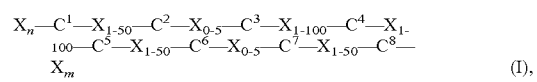

$$X_n-C^1-X_{1-50}-C^2-X_{0-5}-C^3-X_{1-100}-C^4-X_{1-100}-C^5-X_{1-50}-C^6-X_{0-5}-C^7-X_{1-50}-C^8-X_m \quad (I),$$

wherein X can be any of the 20 naturally occurring amino acids (Phe, Leu, Ser, Tyr, Cys, Trp, Pro, His, Gln, Arg, Ile, Met, Thr, Asn, Lys, Val, Ala, Asp, Glu, Gly). The Xs therein can be the same or different. The indices adjacent to X in each case indicate the number of amino acids, C is cysteine, alanine, serine, glycine, methionine or threonine, at least four of the amino acids ($C^1$-$C^8$) designated by C being cysteine, and the indices n and m, each independently of the other, are natural numbers from 0 to 500, preferably from 15 to 300. Those substances and the preparation thereof are known, for example from the literature mentioned at the outset, such as, for example, WO 06/103230.

The polypeptides according to formula (I) are furthermore characterised by the property that at room temperature, after coating a glass surface, they bring about an increase in the contact angle of a water droplet usually of at least 20°, preferably at least 25°, especially preferably at least 30°, and more especially preferably at least 35°, each by comparison with the contact angle of a water droplet of the same size with the glass surface uncoated. The procedure for taking contact angle measurements is known to the person skilled in the art.

The amino acids designated $C^1$ to $C^8$ are preferably cysteines, but they can also be replaced by other amino acids of similar steric structure, preferably by alanine, serine, threonine, methionine or glycine. In any event at least 4, preferably at least 5, especially at least 6 and more especially at least 7 of the positions $C^1$ to $C^8$ are to consist of cysteines. In the proteins according to the invention, cysteines can either be present in reduced form or can form disulfide bridges with one another. Special preference is given to the intramolecular formation of bridges, especially those having at least 1, preferably 2, especially preferably 3 and more especially preferably 4 intramolecular disulfide bridges. In the case of the above-described replacement of cysteines by amino acids of similar steric structure, there are advantageously replaced in pairs the C positions that are capable of forming intramolecular disulfide bridges with one another.

When cysteines, serines, alanines, glycines, methionines or threonines are also used in the positions indicated by X, the numbering of the individual C positions in the general formulae can change accordingly.

For carrying out the present invention, preference is given to the use of hydrophobins of the general formula (II)

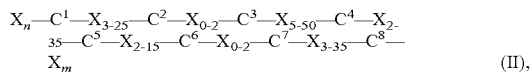

(II), wherein X, C and the indices adjacent to X are as defined hereinabove, the indices n and m are numbers from 0 to 300, and the proteins are furthermore distinguished by the above-mentioned change in contact angle.

Special preference is given to the use of hydrophobins of the general formula (III)

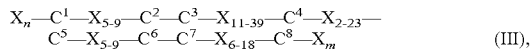

(III), wherein X, C and the indices adjacent to X are as defined hereinabove, the indices n and m are numbers from 0 to 200, and the proteins are furthermore distinguished by the above-mentioned change in contact angle and, further, at least 6 of the amino acids designated by C are cysteine. Especially preferably, all amino acids C are cysteine.

The residues Xn and Xm can be peptide sequences that are also naturally linked to a hydrophobin. One or two of the residues, however, can also be peptide sequences that are not naturally linked to a hydrophobin. Those include also the residues Xn and/or Xm in which a peptide sequence occurring naturally in a hydrophobin has been lengthened by a peptide sequence that does not occur naturally in a hydrophobin.

The proteins used in accordance with the invention can also, in addition, be modified in their polypeptide sequence, for example by glycosylation, acetylation or by chemical crosslinking, for example, with glutaric dialdehyde.

A property of the proteins used in accordance with the invention is the change in surface properties when the surfaces are coated with the proteins. The change in surface properties can be determined experimentally by measuring the contact angle of a water droplet before and after a surface has been coated with the protein and ascertaining the difference between the two measurements.

Suitable hydrophobins for the implementation of the present invention are, for example, those of WO 06/103230. They can also be only parts or derivatives thereof. It is also possible for a plurality of hydrophobins, preferably 2 or 3, of identical or different structure to be linked to one another and to be linked to a corresponding suitable polypeptide sequence that is not naturally bound to a hydrophobin.

Naturally occurring hydrophobins can be isolated from natural sources by suitable methods. Reference is made by way of example to Wösten et. al., Eur. J Cell Bio. 63, 122-129 (1994) or WO 96/41882.

The preparation of hydrophobins can also be carried out by genetic engineering methods in which a nucleic acid sequence, especially a DNA sequence, coding for the hydrophobin in the context of this invention is so inserted into a host organism that the desired protein is produced by gene expression of the nucleic acid sequence. The gene expression can be carried out either in a heterologous or in a homologous host strain. Such methods are known in principle to the person skilled in the art and are disclosed, for example, in WO 06/082251.

Suitable host organisms (production organisms) for the said method of preparation can be prokaryotes (including the Archaea) or eukaryotes, especially bacteria including halobacteria and methanococci, fungi, insect cells, plant cells and mammalian cells, especially preferably *Escherichia coli, Bacillus subtilis, Bacillus megaterium, Aspergillus oryzea, Aspergillus nidulans, Aspergillus niger, Pichia pastoris, Pseudomonas* spec., lactobacilli, *Hansenula polymorpha, Trichoderma reesei*, SF9 (and related cells), among others.

The proteins produced can either be used directly in the form of fusion proteins or, after splitting off and removing the fusion partner, used in the form of "pure" hydrophobins.

The materials to be treated in accordance with the invention with hydrophobins are generally porous materials having a high proportion of cellulose which, untreated, become thoroughly wet in contact with water or aqueous solutions as a result of the capillary action of the pores; examples are microporous cellulosic materials, such as paper, cardboard, wood and also cotton, as well as articles produced therefrom. The method according to the invention has the result that the composition comprising hydrophobin and a solvent penetrates beneath the macroscopic surface of the cellulosic material (penetration of the macroscopic surface, usually by penetrating into the pores of the cellulosic material). The composition used for the treatment accordingly comprises at least one hydrophobin and an aqueous solvent, for example a solvent of which at least 50% by weight is water.

The said materials can be for indoor our outdoor use, there being suitable, for example, both untreated (native) materials of the kind mentioned, and materials that have already been subjected to a pretreatment, such as, for example, impregnation and/or coating, provided that a residual degree of porosity remains that allows the penetration of the hydrophobins in accordance with the invention beneath the surface of the cellulosic material.

In the case of papers and, especially, cardboards treated in accordance with the invention, a dessication effect can be achieved which, for example in the case of packaging paper, is otherwise brought about by introducing silica gel or acrylates. Unlike established effectors, the use according to the invention of hydrophobins enables better compatibility as well as improved biological degradability to be acquired and for that reason the spectrum of use is broadened.

The said materials can be in unprocessed form or in the form of end products, that is to say finished articles; examples of end products consisting of the said materials include, inter alia, timber structures, such as buildings or parts of buildings, windows, doors, floor coverings, wall panelling, kitchen worktops, furniture panels or items of furniture; insulating material for packaging or for building construction, such as, for example, Isoflock® or raw cotton; packaging materials, such as boxes, slats, pallets, cardboard boxes etc. consisting of the said materials.

It will be understood that mixtures of materials are also possible, for example products comprising a plurality of the above-mentioned materials suitable for treatment in accordance with the invention, or product mixtures or composite materials comprising one or more of the mentioned cellulosic materials and one or more further materials, such as plastics, metal, glass, ceramics etc.

For the use of hydrophobins in accordance with the invention to treat the said materials, the hydrophobins can be used in solvent-free form, but preferably they are used in the form of formulations or compositions in at least one suitable solvent.

The choice of hydrophobins for the implementation of the invention is not restricted. One hydrophobin or a plurality of different hydrophobins can be used. The person skilled in the art will make a suitable choice.

The solvents for formulations can be water and/or organic solvents. It will be understood that mixtures of solvents can also be used. The nature of the solvent depends, for example, on the hydrophobin, the nature of the material to be treated and its use, and is chosen accordingly by the person skilled in the art.

The solvent is preferably water or a mixture of water with water-miscible organic solvents. Examples of such organic solvents include water-miscible monohydric or polyhydric alcohols, such as, for example, methanol, ethanol, n-propanol, isopropanol, ethylene glycol, propylene glycol or glycerol. Further possible organic solvents are ether alcohols. Examples include monoalkyl ethers of (poly)ethylene or (poly)propylene glycols, such as ethylene glycol monobutyl ether. Nature and amount of the water-soluble organic solvent are chosen by the person skilled in the art.

To prepare the composition used in accordance with the invention, preferably aqueous solutions of the hydrophobins can be used, which solutions have been obtained in the synthesis, isolation and/or purification of the hydrophobins. Depending on purity, those solutions may still contain residues of materials from the synthesis. It will be understood, however, that it is also possible for the hydrophobins initially to be isolated in solvent-free form, for example by freeze-drying, and formulated only in a second step.

The amount of the hydrophobins in the formulation can be determined by the person skilled in the art in accordance with the nature of the surface and/or the use. Relatively small amounts are already sufficient, however, to achieve an effect, that is to say a change in the properties of the surface. An amount of from 0.0001 to 1% by weight related to the sum of all the components of the formulation has proved suitable, but the invention is not intended thereby to be limited to that range. From 0.0005 to 0.5% by weight is the preferred amount, with from 0.001 to 0.1% by weight being especially preferred.

The formulation can optionally also comprise further components in addition, for example additives and/or adjuvants. Examples of such components include, especially, surfactants, such as, for example, anionic, non-ionic, amphoteric and/or cationic surfactants. Examples of further additives include acids or bases, for example carboxylic acids or ammonia, buffer systems, polymers, inorganic particles such as $SiO_2$ or silicates, dyestuffs or biocides, further wood preservatives, such as lignin stabilisers, light stabilisers, such as, for example, UV absorbers, and/or free-radical trapping agents.

In accordance with the invention, the materials are treated by bringing the surface of the material into contact with hydrophobin or with a composition comprising at least one hydrophobin and at least one solvent.

The "bringing into contact" can be carried out, for example, by, preferably repeated, spraying, coating or roller application, or alternatively by immersing the entire article in the formulation.

The latter is naturally possible only when the articles are not built in. The duration of treatment is determined by the person skilled in the art and can be from a few seconds up to several hours. After treatment, the surface can be rinsed, for example with water, to remove excess treatment solution. The treatment can also be carried out in combination with cleaning of the surface. A cleaning agent that comprises at least one hydrophobin, at least one surfactant and at least one solvent is used for that purpose. In many cases, a treatment is especially advantageously carried out by spraying a solution of the hydrophobin onto the material before final processing thereof or onto the article in finished form. The film of liquid produced by the spraying process according to the invention penetrates into the microporous surface of the material or article and so produces the desired effect. Any further change to the surface, such as, for example, an undesired structural change, warping, roughening etc., can thus be minimised or avoided.

The treatment can be carried out at temperatures below room temperature, at room temperature or at elevated temperatures, for example at from 0 to 100° C., preferably from 20 to 60° C. Likewise possible is the use of elevated pressure, for example for the treatment of wood, during which also temperatures of more than 100° C. can be used.

Following treatment with the composition, the treated material is dried. The drying can be carried out, for example, by simply leaving to stand, with or without shaping pressure, at room temperature or at elevated temperatures. Drying can likewise be carried out at reduced pressure or by using a stream of air.

The treatment and optionally the drying can be followed by a thermal after-treatment at elevated temperatures, for example at temperatures of up to 120° C. The thermal after-treatment can naturally also be carried out in combination with the drying. Preferably, the temperatures in a thermal after-treatment are from 30 to 100° C., especially from 40 to 80° C., for example from 50 to 70° C. The duration of treatment is determined by the person skilled in the art and may be, for example, from 1 min. to 10 hours. Depending on the nature of the treatment, the thermal after-treatment can be carried out, for example, by irradiation of the surface using an IR radiator or by blowing on streams of warm air.

By means of the method according to the invention there is obtainable a cellulosic material that comprises at least one hydrophobin (hydrophobin-impregnated material). With the treatment it is possible to obtain a material of which the pores or capillary systems are coated with at least a monomolecular layer of the hydrophobin.

At least a dirt-repellent and/or hydrophobising and/or preserving effect is achieved by means of the treatment according to the invention. As a rule, at least two of the advantages are achieved, especially combined hydrophobisation and preservation. The hydrophobins have an appreciable effect even in very small amounts. Usually, treatment even with a composition containing only 0.01% by weight hydrophobins results in a change in the cellulosic material that is effective.

The dirt-repellent effect can be ascertained by methods that are known in principle, for example by comparison of the removability of dirt by rinsing off an untreated surface and a hydrophobin-treated surface with water. The hydrophobisation can be ascertained in known manner by measuring the contact angle.

The following Examples are to illustrate the invention in greater detail; unless stated otherwise, room temperature (RT) indicates a temperature in the range from 20 to 25° C.

EXAMPLE 1

Use of a Hydrophobin to Impart Water-repellent Properties to Paper

Substrates:
A) Filter paper (fibreglass microfilter, Whatman, Schleicher & Schuell)
B) Paper (neutrally sized 85 g/m²)
Hydrophobin solution: Aqueous solutions, pH 4-6, containing 100 μg/ml protein are used.
Hydrophobins employed: Hydrophobins produced recombinantly in *E. coli*, of class I (from *Pleurotus ostreatus*, PO and *Talaromyces thermophilus*, TT and *Schizophyllum commune*, SC) and class II (from *Trichoderma reesei*, TR). Hydrophobin from *Trichoderma reesei* can also be obtained by submerged fermentation of the wild type and work up.
Treatment of substrates A and B: Small pieces of paper (1.2 cm×1.2 cm) are incubated for from 1 to 16 hours at room temperature (RT=20-25° C.) in the hydrophobin solution and are then dried to constant weight in air (RT). That procedure is repeated up to three times. After each round of treatment, the effect achieved is ascertained by the application of a 5 μl water droplet. The time from when the water droplet is applied to when it has completely soaked in is measured and a comparison is carried out with a paper specimen that has been treated with water only (pH 4) ("untreated" paper) instead of with hydrophobin solution.
Result substrate A, Hydrophobin TR: In the case of untreated paper, the water droplet soaks in while still being applied, whereas the droplet on treated paper is fully absorbed into the paper matrix only after 4±2 s (one round of treatment) and 33±8 s (two rounds of treatment) (desiccation, see FIG. 1). Following treatment three times with hydrophobin solution, water absorption by the paper appears to be stopped completely; disappearance of the water droplet after 54.7±2.3 min. can be explained by simple evaporation. For comparison: a 5 μl water droplet applied to an impermeable Teflon film evaporates after 59.7±0.6 min.
Result substrate B, Hydrophobin TR: In the case of untreated paper, the water droplet soaks in within 36±9 s, leaving a distinct moisture stain. Following hydrophobin treatment three times there is no visible water absorption; the water droplet remains on the surface of the paper and finally disappears after 61.2±3.1 min. as a result of evaporation.

Comparable results to those for hydrophobin TR are also obtained after treating cardboard by spraying with a solution of the other above-mentioned hydrophobins.

EXAMPLE 2

Use of a Hydrophobin to Increase the Hydrophobicity of Wood
Material:
Substrate A: Pine sapwood (2.5 cm×1.5 cm×2.5 cm; L×B×H)
Substrate B: Beech sapwood (2.5 cm×1.5 cm×2.5 cm; L×B×H)
Hydrophobin solution: 100 μg/ml class II hydrophobin from *Trichoderma reesei* in $H_2O$, pH 4. The hydrophobin is obtained either by recombinant expression in *E. coli* or by fermentation of the wild type.
Treatment of substrates A and B: The blocks of wood are immersed with their bottom sides in a hydrophobin bath (final level of fill 0.5-0.7 cm) and incubated for 5 min. at room temperature (RT=20-25° C.). Drying in air to constant weight is then carried out. That treatment is repeated five times, and is followed by a further incubation in hydrophobin solution overnight and air drying. The same hydrophobin solution is used for all incubation steps. For the negative control, a hydrophobin-free solution ($H_2O$, pH 4) is used for the treatment.

To measure the effect achieved, the blocks of wood are immersed with their bottom sides in a water bath (final level of fill 0.5-0.7 cm), and the time taken for the water to be absorbed is recorded. For that purpose the blocks of wood are removed from the water bath at defined points in time, are tapped to remove droplets adhering to the surface, and are weighed.
Results substrate A: In comparison with the negative control ("untreated" wood), an appreciably retarded absorption of water is to be observed after hydrophobin treatment (FIG. 2). Whereas in the case of untreated wood the saturation range is reached after only 16 min., the treated wood absorbs a corresponding amount of water only after approximately 1 hour.
Results substrate B: Following treatment with hydrophobins of class II, the formation of a water-impermeable barrier is to be observed in the block of wood at the level of the depth of immersion. Irrespective of whether the top side or the bottom side is immersed in water, there is no penetration of moisture through the block of wood to be observed across the barrier (FIG. 3).

EXAMPLE 3

Use of a Hydrophobin to Reduce the Absorption of Water or Vapour by Wood
Material:
Substrate: Pine sapwood (2.5 cm×1.5 cm×2.5 cm; L×B×H); cross-cut ends sealed with Nuvovern ACR enamel paint 4:1 GL white
Hydrophobin solution: 100 μg/ml in pure water, pH 6. Hydrophobins, produced recombinantly in *E. coli*, of class I (from *Pleurotus ostreatus*, PO and *Talaromyces thermophilus*, TT) and of class II (from *Trichoderma reesei*, TR) are used.
Procedure: The blocks of wood are fully sprayed with hydrophobin solution three times (control: pure water). Between the individual spraying operations, a drying step of 60 min. at 37° C. is carried out.
To measure the absorption of water, the blocks of wood are completely immersed in a water bath and the time taken for water to be absorbed is recorded. For that purpose the blocks of wood are removed from the water bath at defined points in time, are tapped to remove droplets adhering to the surface, and are weighed. To measure the absorption of vapour, the blocks of wood are exposed to a saturated steam atmosphere at 28° C. and regularly weighed. All experiments are carried out in triplicate.
Results:
In comparison with the control, an appreciably reduced absorption of water by the hydrophobin-treated specimens—both class I and class II—is to be observed (FIGS. 4A and B). Water absorption after, for example, 3 hours is reduced by up to 30% as a result of the complete-immersion treatment. Also the steam absorption is reduced by spray treatment of the wood surface with hydrophobin (FIG. 4C).

BRIEF DESCRIPTION OF THE DRAWINGS

FIG. 4, Water/vapour absorption according to Example 3:

Figure 1:
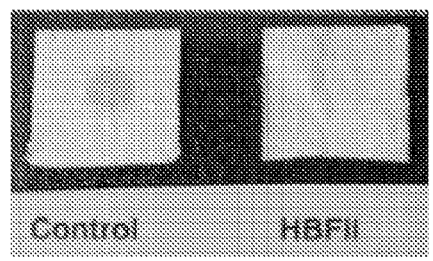
FIG. 1 shows the treatment of filter paper according to Example 1. Following treatment with a hydrophobin of class II (TR, specimen on the right) the absorption of water, unlike in the case of the untreated control (specimen on the left), does not result in the formation of a moisture stain.
Figure 2:
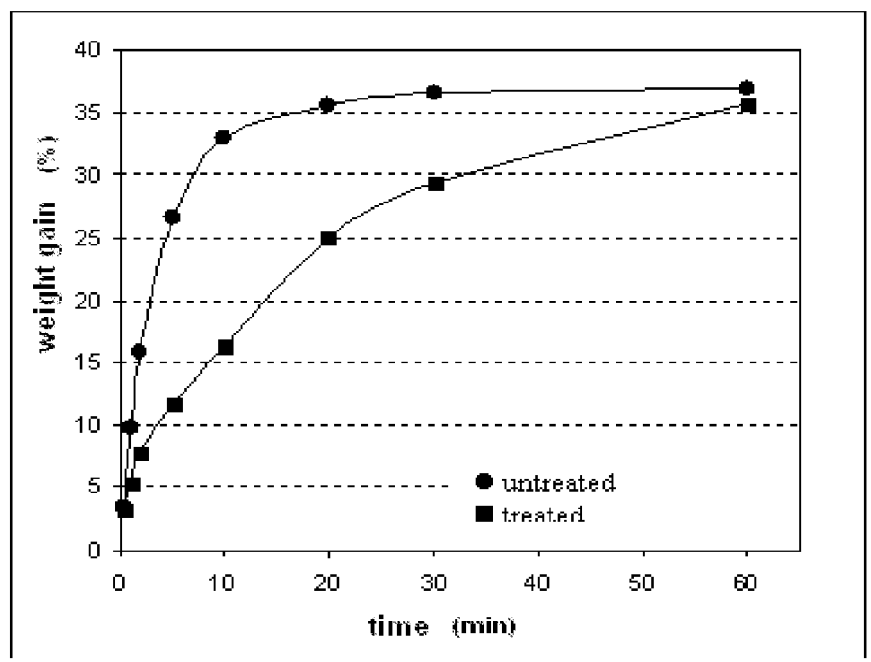
FIG. 2: Absorption of water in pine sapwood according to Example 2. The relative increase in weight of an untreated block of wood (5.6 g dry weight) and a hydrophobin-treated block (5.3 g dry weight) is shown.
Figure 3:
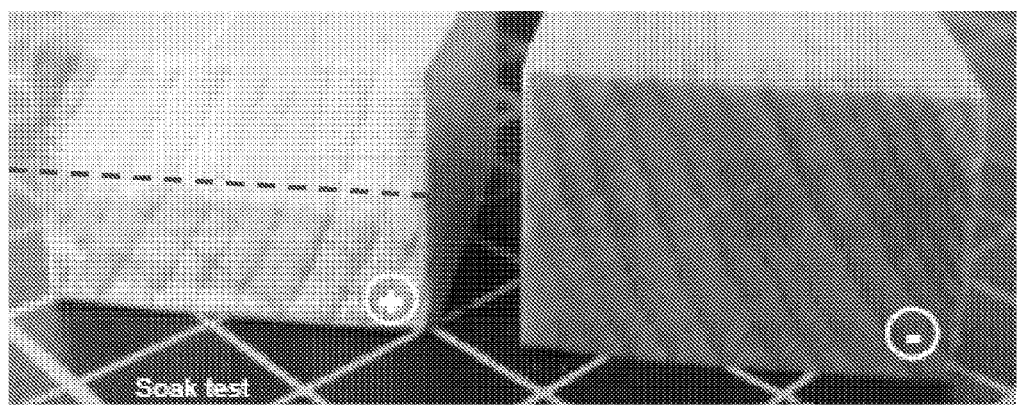
FIG. 3: Unlike the untreated control (right), blocks of beech wood (Example 2, substrate B) treated with class II hydrophobins by the immersion of one side in water are not completely penetrated through by moisture.
Figure 4A:
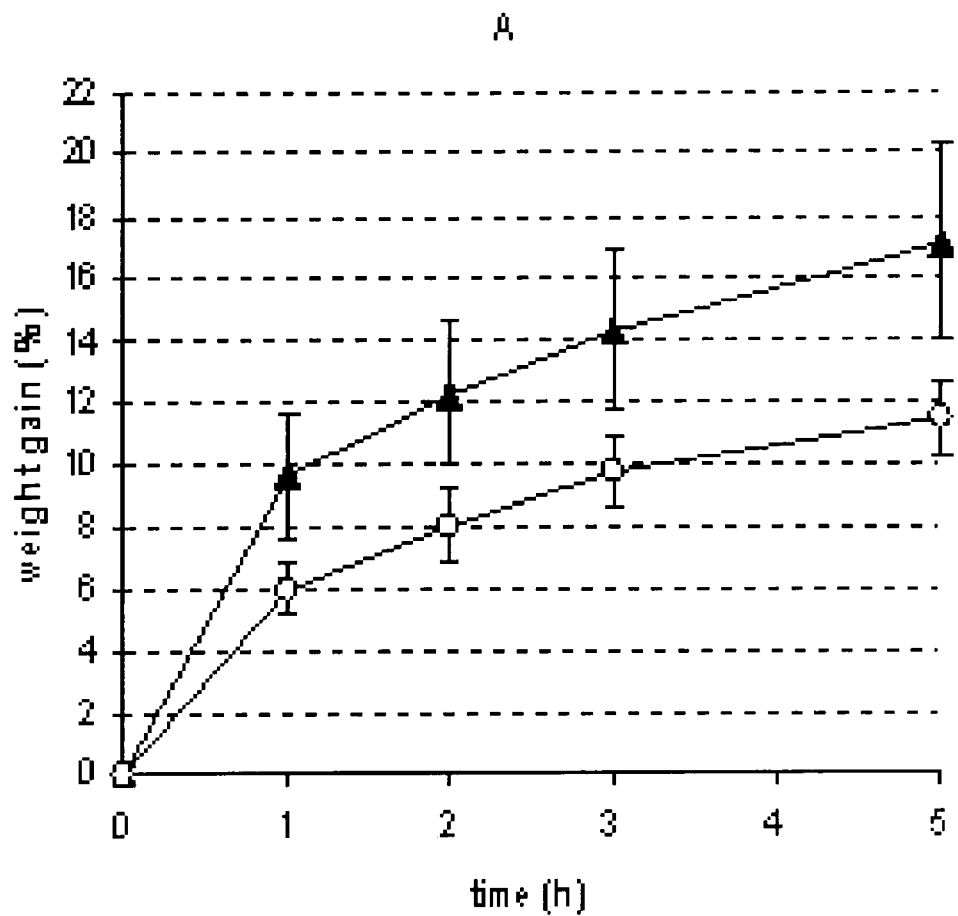
FIG. 4A: Water absorption by blocks of wood (blank circles) coated with class II hydrophobin (TR) in comparison with the pure water controls (filled-in triangles).
Figure 4B:
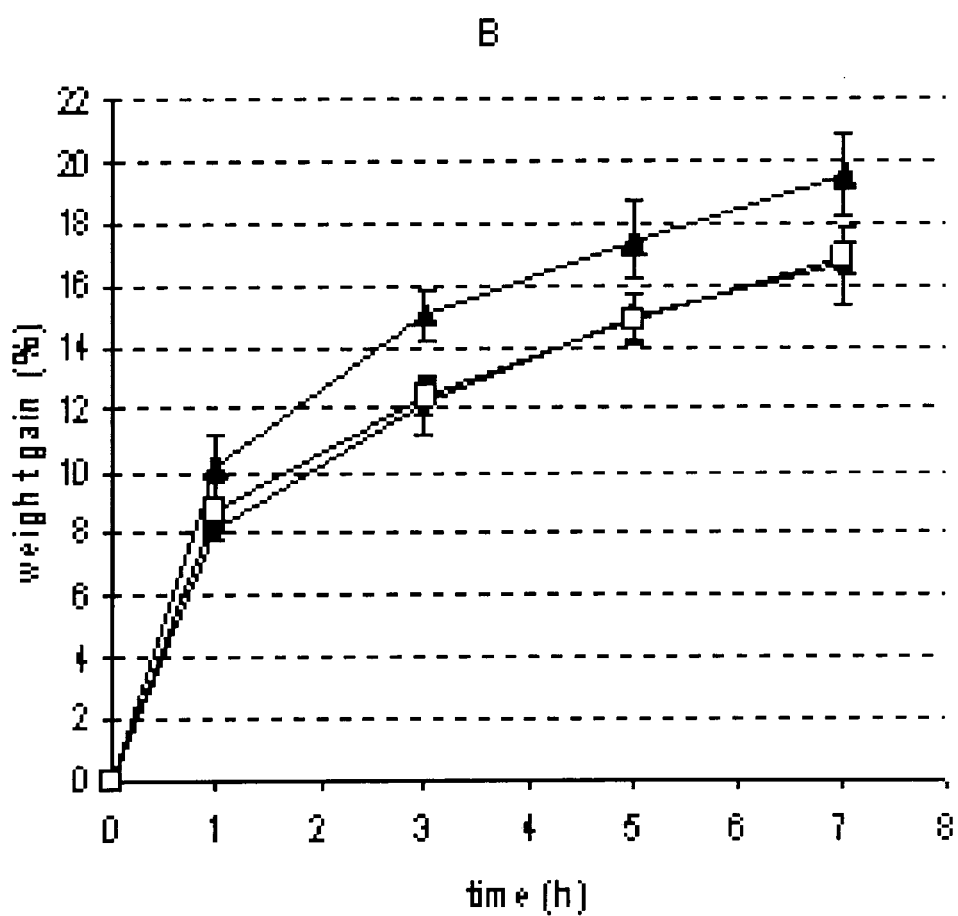
FIG. 4B: Water absorption by blocks of wood coated with class I hydrophobin; pure water controls (filled-in triangles), TT (filled-in circles), PO (blank squares).
Figure 4C:
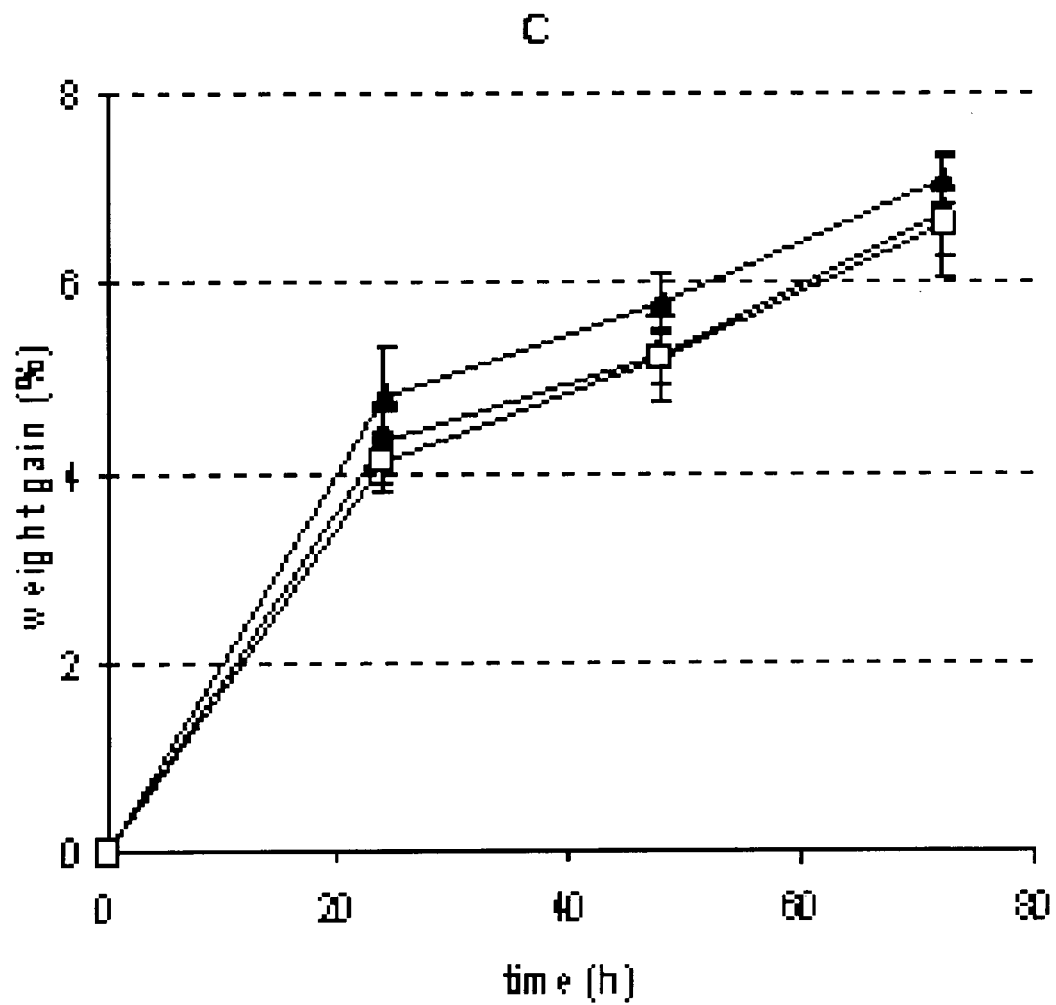
FIG. 4C: Steam absorption by blocks of wood coated with class I hydrophobin; pure water controls (filled-in triangles), TT (filled-in circles), PO (blank squares).

What is claimed is:

1. A method of treating wood by bringing the wood into contact with at least one hydrophobin, wherein the treatment comprises a composition comprising at least one hydrophobin and an aqueous solvent, wherein the composition penetrates beneath the surface of the wood.

2. A method according to claim 1, wherein the composition further comprises components selected from surfactants, acids, bases, buffer systems, polymers, inorganic particles, dyestuffs, biocides, lignin stabilisers, light stabilisers, UV absorbers, and free-radical trapping agents.

3. A method according to claim 1 for increasing water repellency, dirt repellency, dimensional stability, color fastness, resistance to weathering and/or resistance to rotting of the wood in comparison with the untreated wood.

4. A method according to claim 2, wherein the amount of hydrophobins in the composition is from 0.0001 to 1% by weight related to the sum of all the components of the composition used for the treatment.

5. A method according to claim 2, wherein after the treatment with hydrophobin and solvent the wood is dried.

6. A method according to claim 1, wherein the treatment is carried out by spraying a solution of the hydrophobin onto the wood before the final processing thereof or onto the article in finished form.

7. A hydrophobin-impregnated wood material.

8. The wood treated in accordance with claim 1 which, compared with the untreated wood, has a higher level of water repellency, of dirt repellency, of dimensional stability and/or of resistance to weathering or to rotting.

9. The wood according to claim 7 in the form of a timber structure.

10. The wood according to claim 9 in which the timber structure is selected from the group consisting of part of a building, a window, a door, floor covering, wall paneling, a kitchen worktop, furniture panel, item of furniture, insulating material for packaging or for building construction and packaging material.

* * * * *